(12) United States Patent
Donkers et al.

(10) Patent No.: US 10,648,590 B2
(45) Date of Patent: May 12, 2020

(54) MARINE PIPELAYING FRICTION CLAMP DEVICE

(71) Applicant: ITREC B.V., Schiedam (NL)

(72) Inventors: Jeroen Adrianus Joseph Donkers, Schiedam (NL); Terence Willem August Vehmeijer, Schiedam (NL); Stefan Cornells Van Ruyven, Schiedam (NL); Joop Roodenburg, Schiedam (NL); Wouter Johannes Slob, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 16/329,135

(22) PCT Filed: Aug. 28, 2017

(86) PCT No.: PCT/NL2017/050563
§ 371 (c)(1),
(2) Date: Feb. 27, 2019

(87) PCT Pub. No.: WO2018/044156
PCT Pub. Date: Mar. 8, 2018

(65) Prior Publication Data
US 2019/0203853 A1 Jul. 4, 2019

(30) Foreign Application Priority Data

Aug. 30, 2016 (NL) ...................................... 2017396

(51) Int. Cl.
*F16L 1/23* (2006.01)
(52) U.S. Cl.
CPC ..................................... *F16L 1/23* (2013.01)

(58) Field of Classification Search
CPC combination set(s) only.
See application file for complete search history.

(56) References Cited

U.S. PATENT DOCUMENTS

| 6,729,803 B1 | 5/2004 | Baylot |
| 2010/0034592 A1 | 2/2010 | Roodenburg et al. |
| 2012/0177443 A1 | 7/2012 | Baylot et al. |

(Continued)

OTHER PUBLICATIONS

International Search Report, issued in PCT/NL2017/050563, dated Nov. 22, 2017.

(Continued)

*Primary Examiner* — Kyle Armstrong
(74) *Attorney, Agent, or Firm* — Birch, Stewart, Kolasch & Birch, LLP

(57) ABSTRACT

A marine pipelaying friction clamp device for frictionally retaining an offshore subsea pipeline to be launched into the sea includes a frame which includes a main frame structure that is adapted to be supported by the pipelaying vessel. The frame supports multiple annular arrays of clamping units adapted to simultaneously engage separate portions of the pipeline. The frame further includes one or more mobile subframes for one or more of said annular arrays of clamping units. Each of said one or more mobile subframes is movably supported by the main frame structure so as to be mobile relative to said main frame structure in said longitudinal direction of the clamp device, and each of said one or more mobile subframes is supported by a spring assembly.

19 Claims, 3 Drawing Sheets

(56) References Cited

U.S. PATENT DOCUMENTS

2014/0079486 A1* 3/2014 Argelli ............... F16L 1/23
405/158
2015/0159444 A1* 6/2015 Stankovic ........... E21B 33/0422
166/77.52

OTHER PUBLICATIONS

Written Opinion of the International Searching Authority, issued in PCT/NL2017/050563, dated Nov. 22, 2017.

* cited by examiner

MARINE PIPELAYING FRICTION CLAMP DEVICE

The present invention relates to a marine pipelaying friction clamp device and a method for launching an offshore subsea pipeline from a pipelaying vessel into the sea From the prior art, marine pipelaying friction clamp devices according to the preamble of claim 1 are known. Having multiple annular arrays of clamping units simultaneously engage separate portions of the pipeline provides a large contact area between the clamp device and the offshore subsea pipeline. In embodiments, an overall length of e.g. 4 meters of pipeline is engaged simultaneously. The weight of the offshore subsea pipeline causes elongation of the pipeline. For example, the weight exerted on the 4 meters of engaged pipeline may cause an elongation of several millimetres, up to 10-20 millimetres.

A problem of such a known friction clamp device is that the load exerted by the pipeline on the clamp device is not evenly distributed over the arrays of clamping units.

The aim of the invention is to provide a friction clamp device in which the load exerted by the pipeline is distributed more evenly on the clamp device.

This is achieved according to the characterizing portion of claim 1. The effect of the subframes being supported movably by the main frame structure and being supported by a spring assembly is to allow for elastic adjustment of the mobile subframe in said longitudinal direction when said clamping unit frictionally engages the portion of the pipeline and is loaded in said direction by said pipeline. With the elastic adjustment of the mobile subframe also the position of the friction force actuators is adjusted in the longitudinal direction, the elasticity compensating the effect of elongation of the portion of pipeline that is engaged, due to the weight of the pipeline.

Such a marine pipelaying friction clamp device according to the invention is of a versatile design. In particular, there is design freedom in the construction of main frame structure and one or more mobile subframes, and there is a lot of freedom in choosing a type of spring assembly.

According to the invention, the mobile subframe is supported by a spring assembly. The invention is versatile, for example because it is both conceivable and within the scope of this invention that the spring assembly is interpositioned between the mobile subframe and the main frame structure, and that the spring assembly is interpositioned between adjacent mobile subframes. This design flexibility allows different settings to achieve a more even distribution of the load exerted by the pipeline on the clamp device.

A further attribute to the versatility is the design freedom in the spring assembly. It is conceivable that characteristics of the spring assembly can be controlled, e.g. set, e.g. different settings for different types of pipelines. Such a setting can be made prior to lowering the pipeline. Or even different settings for different sections of the pipeline to be launched. It is also conceivable that the characteristics of the spring assembly can be adjusted or altered during pipelaying.

The spring characteristics may be controlled manually. It is also conceivable that a control unit is provided to control the characteristics.

In embodiments, sensors are provided, e.g. measuring axial and/or radial clamping forces of the clamp device, in particular of the clamping units. In particular, sensors may be provided measuring for each annular array of clamping units the clamping force. It is conceivable that the output data of such a sensor is used as input for a control unit controlling the spring characteristics. The invention allows to set the squeeze force of the clamp device independently of the axial force exerted by the pipeline.

An example of such a spring characteristic that can be controlled is the spring constant or a bias or prestress. It is both conceivable that a spring assembly with a positive spring constant (>0) is applied, and that spring assemblies having a spring constant equal to zero are applied so as to get a constant force spring. It is conceivable that a nonlinear spring assembly is applied. Possibly, spring characteristics can be set individually for each mobile subframe. Possibly, the bias of a spring assembly can be set distinctly for each annular array of clamping units.

Further versatility is achieved in that the spring assembly may be formed by a variety of conceivable assemblies, e.g. comprising coil springs, disc springs, hydraulic or gas cylinders coupled with an accumulator. The spring assembly may comprise devices used to control the spring characteristics, such as a cylinder coupled with an accumulator.

According to the invention the frame comprises a main frame structure and, for one or more of said annular arrays of clamping units, one or more mobile subframes. Preferably mobile subframes are provided for multiple of said annular arrays. Possibly, mobile subframes are provided for all annular arrays. It is also well conceivable that the upper annular array of clamping units is connected to and supported by the main frame structure, and not by a mobile subframe.

In embodiments, an annular array of clamping units comprises a mobile subframe carrying the clamping units of the respective annular array of clamping units. It is also conceivable that a mobile subframe carries the clamping units of two or more annular arrays.

In embodiments, the one or more mobile subframes are provided with a door portion comprising a clamping unit, which door portion is connected to the remainder of the mobile subframe via a hinge extending in the longitudinal direction of the clamp structure allowing rotation of the door portion to allow the entry or removal of the pipeline.

An underwater pipeline is normally assembled on the pipelaying vessel, and comprises a number of pipes joined to cover distances of hundreds of kilometres. Commonly, such pipes have a standard length of 12 meters, and range in diameter from 0.2-1.5 meters. The offshore subsea pipeline to be launched into the sea is in embodiments a coated pipeline, e.g. a polymer coating to protect the steel cylinder from corrosion and heat loss; and possibly a concrete coating to weight the pipe down.

The clamp device of the invention comprises multiple annular arrays of clamping units adapted to simultaneously engage separate portions of the pipeline. In particular at least two annular arrays are provided. The number of annular arrays may add e.g. up to 10 arrays, wherein 4-6 arrays is common. Each annular array of clamping units comprises multiple clamping units. In particular at least two clamping units are provided in each annular array. The number of clamping units may add up e.g. to 8 clamping units, wherein 3-6 clamping units is common. It is noticed that the versatile design of the clamp device of the invention allows a large variety of designs.

In a common design, the friction clamp device comprises 5 annular arrays of clamping units engaging e.g. 3-5 meters of pipeline.

It is common that each clamping unit comprises a friction pad adapted to frictionally engage a portion of the pipeline and an associated friction force actuator, e.g. an hydraulic actuator, e.g. a radially mounted hydraulic cylinder, adapted to force the friction pad against the pipeline. Such a friction pad is commonly a bulky item, having a length of larger than 50 cm, e.g. up to 80 cm, and a weight of hundreds of kilo's, e.g. 400 kg.

The friction clamp device of the present invention enables a design wherein each clamping unit comprises multiple friction pads simultaneously actuated by a single associated friction force actuator. The advantage of multiple friction pads is that the weight of a friction pad can be reduced, thereby facilitating the exchangeability of such friction pads and hence the versatility of the friction clamp device.

As indicated above, known friction clamp devices are provided with elastic members interposed between a friction pad and the friction force actuator. It is conceivable that a construction similar to that of a tensioner pad is applied, as known from and commercially available by the applicant. The versatile design of the friction clamp device of the invention allows for the provision of a spring assembly supporting a mobile subframe and the simultaneous provision of one or more elastic members interposed between the friction pad and the friction force actuator.

The marine pipelaying friction clamp device of the invention is designed for frictionally retaining an offshore subsea pipeline to be launched into the sea during the laying of the pipeline from a pipelaying vessel. Such an offshore subsea pipeline can be a continuous pipeline or, advantageously, constituted of interconnected elongated members.

The pipelaying vessel can be J-lay vessel, wherein the pipeline is formed in a vertical assembly line and laid in a substantially vertical position, so the portion of the pipeline between the laying vessel and the bottom of the sea assumes a J-shape. This method is particularly suitable for laying pipelines in very deep water.

Yet alternatively, the pipelaying vessel can be an S-lay vessel, wherein the pipeline is formed in a substantially horizontal assembly line, and laid using a laying device, a so-called stinger, guiding and supporting the pipeline along a curved path. Pipelines laid using this method assume an S-shape between the vessel and the bottom of the sea.

It is also conceivable that the vessel is a reel-lay vessel, wherein pipeline is stored on and laid from a reel or carousel. The marine pipelaying friction clamp device of the invention may be used instead of or in addition to a tensioner.

During laying a pipeline, there is a need for frictionally retaining the pipeline to clamp the pipeline firmly and prevent it from moving relative to the pipelaying vessel.

The clamp device of the invention comprises multiple annular arrays of clamping units adapted to simultaneously engage separate portions of the pipeline. At least two of such annular arrays are supported in series in a longitudinal direction of the clamp device by a frame. This frame comprises a main frame structure that is adapted to be supported by the pipelaying vessel.

For example, the main frame structure is supported by the deck of an S-lay pipelaying vessel. It is also conceivable that the main frame structure is supported by a tower of a J-lay pipelaying vessel. In such embodiments, it is both conceivable that the friction clamp device of the invention is provided as a mobile clamp, movable along tower, and/or that the friction clamp device of the invention the used as a static clamp, e.g. provided on deck or attached to a tower.

The invention further relates to a method for launching an offshore subsea pipeline from a pipelaying vessel into the sea, wherein during launching use is made of a marine pipelaying friction clamp device for frictionally retaining the pipeline according to any of the claims 1-11.

The present invention also relates to a marine pipelaying friction clamp device for frictionally retaining an offshore subsea pipeline to be launched into the sea during the laying of the pipeline from a pipelaying vessel, wherein the clamp device comprises:

a frame which comprises a main frame structure that is adapted to be supported by the pipelaying vessel, wherein the frame supports, in series in a longitudinal direction of the clamp device which corresponds to the axis of the pipeline to be retained, multiple annular arrays of clamping units adapted to simultaneously engage separate portions of the pipeline, wherein each annular array of clamping units comprises multiple clamping units, wherein each clamping unit comprises a friction pad adapted to frictionally engage a portion of the pipeline and an associated friction force actuator, e.g. an hydraulic actuator, e.g. a radially mounted hydraulic cylinder, adapted to force the friction pad against the pipeline, characterized in that the frame comprises, for one or more of said annular arrays of clamping units, preferably for multiple of said annular arrays, one or more mobile subframes, wherein each of said one or more mobile subframes carries one or more clamping units, wherein each of said one or more mobile subframes is movably supported by the main frame structure so as to be mobile relative to said main frame structure in said longitudinal direction of the clamp device, and wherein each of said one or more mobile subframes is supported by a position control mechanism.

The position control mechanism is adapted to control the position of the mobile subframe relative to the main frame structure or relative to another mobile subframe, for example on the basis of a parameter such as the load on the respective subframe. For example, the position control mechanism may comprise a spindle, a spindle actuator to set the position of the spindle and possibly a sensor providing input for the spindle actuator.

The invention will further be elucidated in relation to the drawings, in which.

Figure 1A:
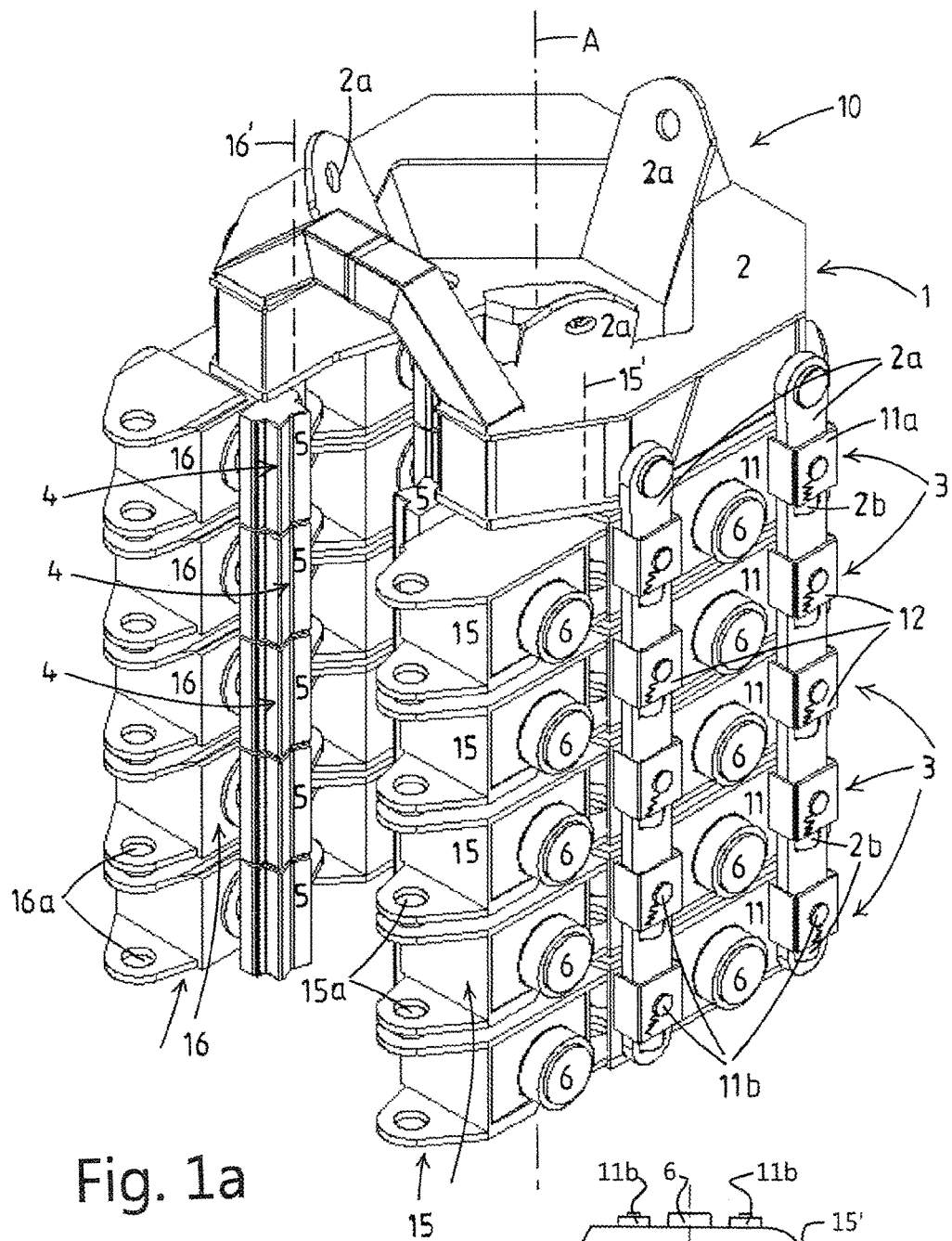
FIG. 1a is a perspective view of a schematical representation of a first embodiment of the present invention in an open configuration.
Figure 1B:
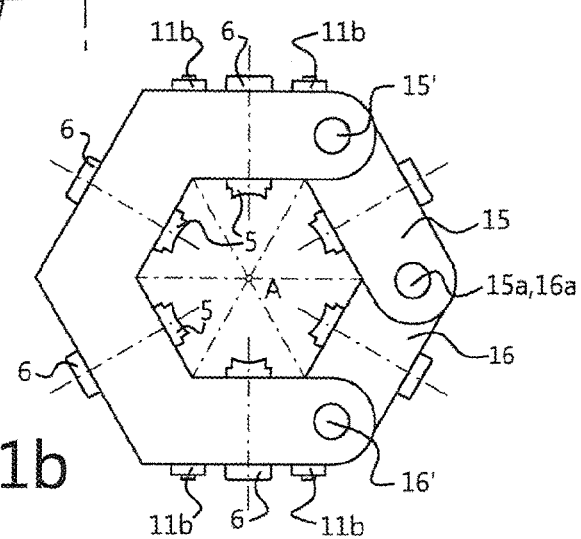
FIG. 1b is a schematical cross-section of the embodiment of FIG. 1a in a closed configuration.

FIGS. 1a and 1b relate to a first embodiment of a marine pipelaying friction clamp device (10) according to the present invention.

Figure 2:
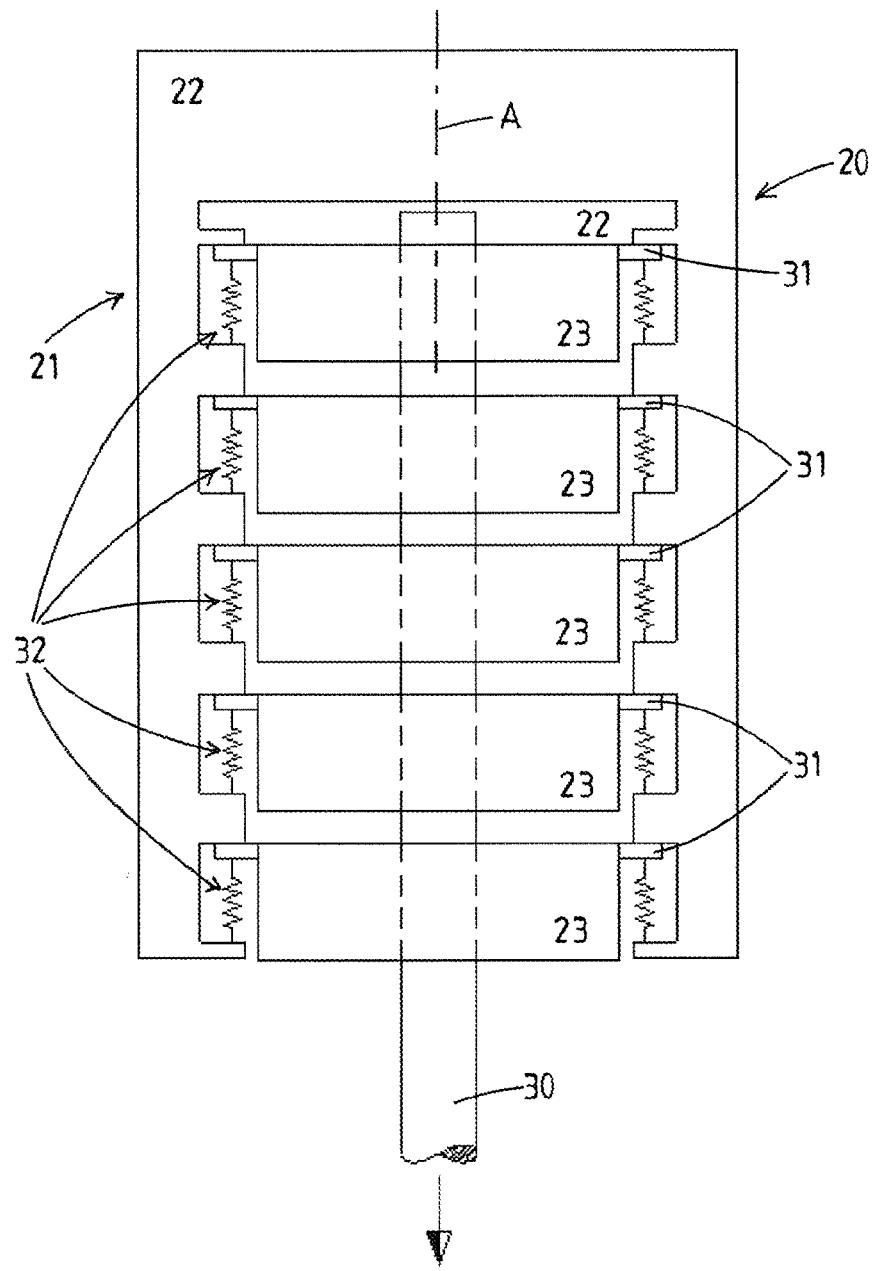
FIG. 2 is a schematic representation of the working principle of a second embodiment of the present invention.

The marine pipelaying friction clamp device 10 is adapted to frictionally retain an offshore subsea pipeline (not visible in FIG. 1) to be launched into the sea during the laying of the pipeline from a pipelaying vessel. In FIGS. 1 and 2, the axis A of the pipeline to be retained is shown.

The clamp device 10 comprises a frame 1 which comprises a main frame structure 2 that is adapted to be supported by the pipelaying vessel, not shown in the drawings. In FIG. 1, mounting brackets 2*a*, which are part of the main frame structure 2 are visible. In these mounting brackets 2*a* are provided vertically extending slots 2*b*.

The frame 1 supports, in series in a longitudinal direction of the clamp device which corresponds to the axis A, multiple, here 5, annular arrays 3 of clamping units 4 adapted to simultaneously engage separate portions of the pipeline. Each annular array of clamping units 3 comprises multiple, here 6, clamping units 4.

Such clamping units are commonly known in the art and only schematically indicated in the drawings. Each clamping unit comprises a friction pad 5 adapted to frictionally engage a portion of the pipeline and an associated friction force actuator 6, here a radially mounted hydraulic cylinder, adapted to force the friction pad against the pipeline.

According to the shown embodiment, the frame 1 comprises for each of said annular arrays of clamping units a mobile subframe 11. In the shown embodiment 5 of such mobile subframes are schematically shown.

According to the invention, the frame 1 comprises one or more mobile subframes for one or more annular arrays of clamping units. It is conceivable that one or more annular arrays of clamping units are not supported by a mobile subframe, but by the main frame structure. For example the upper annular array can be supported by the main frame structure. Such an embodiment is not shown.

In order to achieve the desired effect of the invention, all clamping units of an annular array of clamping units are supported by a mobile subframe. It is highly advantageous that there is a single mobile subframe 11 supporting all clamping units 4 of an annular array 3.

Each of said one or more mobile subframes 11 is movably supported by the main frame structure 2, so as to be mobile relative to said main frame structure in said longitudinal direction of the clamp device. To this end, the mobile subframes 11 comprise U-shaped brackets 11a positioned over elongated main frame structure parts, embodied as mounting brackets 2a, in which pins 11b are provided which extend into the slots 2b of mounting brackets 2a. Between these pins 11b of the mobile subframe and the slots 2b of the main frame structure 2 spring assemblies 12 are provided.

As a result of this design, the mobile subframes 11, each supporting an annular array of clamping units, are mobile relative to the main frame structure 2 to a certain extent, wherein the spring assembly 12 allows for elastic adjustment of the mobile subframe 11 in said longitudinal direction A when said clamping unit frictionally engages the portion of the pipeline and is loaded in said direction by said pipeline.

In the embodiment of FIG. 1, the mobile subframes 11 are each provided with a door portion 15, 16. Hence, the mobile subframe comprises a U-shaped part and two door portions. Each door portion 15, 16 comprises a clamping unit 4 of which both friction pads 5 and cylinders 6 are visible. These clamping units are part of the annular arrays of clamping units. The door portions are connected to the remainder of the mobile subframe via a hinge (15'; 16') extending in the longitudinal direction of the clamp structure allowing rotation of the door portion to allow the entry or removal of the pipeline. clamping units 4. The annular arrays can be closed by pivoting the door portions 15, 16 towards the remainder of the mobile subframe and interconnecting holes 15a of door portions 15 and holes 16a of door portions 16, as visible in FIG. 1b.

In the shown embodiment, 5 arrays of 6 clamping units are provided. In this embodiment, each annular array of clamping units is individually carried by a mobile subframe. Each mobile subframe is supported by four spring assemblies.

Advantageously, the characteristics of all these 20 spring assemblies can be set individually. In particular the characteristics of the spring assemblies of an annular array can be set individually.

The shown embodiment of the marine pipelaying friction clamp device 10 is suitable to be used as a travelling clamp able to retain 1200 tons of pipeline.

In FIG. 2 a second embodiment of a marine pipelaying friction clamp device 20 is schematically indicated. The clamp device 20 is adapted to frictionally retain an offshore subsea pipeline 30 to be launched into the sea during the laying of the pipeline from a pipelaying vessel.

The clamp device 20 comprises a frame 21 which comprises a main frame structure 22 that is adapted to be supported by the pipelaying vessel. The frame supports, in series in a longitudinal direction of the clamp device which corresponds to the axis A of the pipeline to be retained, multiple annular arrays 23, here 5, of clamping units (not shown) adapted to simultaneously engage separate portions of the pipeline.

Each annular array of clamping units 23 comprises multiple clamping units (not shown), wherein each clamping unit comprises a friction pad adapted to frictionally engage a portion of the pipeline and an associated friction force actuator, e.g. an hydraulic actuator, e.g. a radially mounted hydraulic cylinder, adapted to force the friction pad against the pipeline.

The frame 21 comprises, for each annular array, one or more mobile subframes 31, wherein each of said one or more mobile subframes 31 carries the clamping units (not shown) of the respective annular array of clamping units 23.

Each of said one or more mobile subframes 31 is movably supported by the main frame structure 22 so as to be mobile relative to said main frame structure in said longitudinal direction of the clamp device, and each of said one or more mobile subframes 31 is supported by a spring assembly 32.

Similar to the embodiment of FIG. 1, the spring assembly 32 in FIG. 2 is interpositioned between the mobile subframe 31 and the main frame structure 22.

Figure 3:
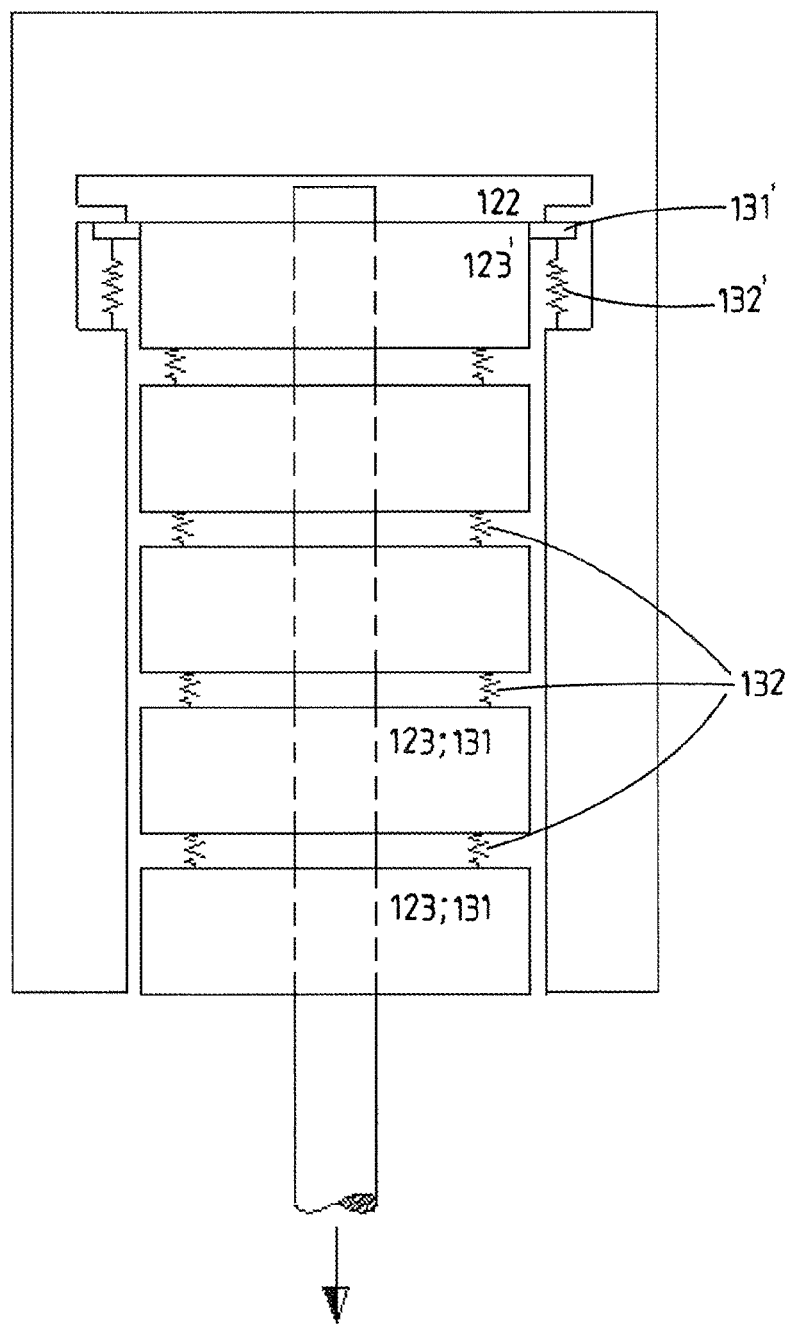
FIG. 3 is a schematic representation of the working principle of a third embodiment of the present invention.

In FIG. 3, a schematic representation of a third embodiment of a pipelaying friction clamp device according to the invention is shown, similar to the representation of FIG. 2. Upper annular array of clamping units 123' is carried by a mobile subframe 131', which is mobile relative to main frame structure 122 and which is supported by an elastic support 132', provided between the mobile subframe 131' and the main frame structure 122. The invention of FIG. 3 also comprises mobile subframes 131 supporting annular arrays of clamping units 123, which are supported by a spring assembly 132. In this third embodiment, the spring assembly is interpositioned between adjacent mobile subframes 131.

The invention claimed is:

1. A marine pipelaying friction clamp device for frictionally retaining an offshore subsea pipeline to be launched into the sea during the laying of the pipeline from a pipelaying vessel, comprising: a frame which comprises a main frame structure that is adapted to be supported by the pipelaying vessel, wherein the frame supports multiple annular arrays of clamping units in series in a longitudinal direction of the frame corresponding to an axis of the pipeline to be retained, the annular arrays of clamping units adapted to simultaneously engage separate portions of the pipeline, wherein each annular array of clamping units comprises multiple clamping units, wherein each clamping unit comprises a friction pad adapted to frictionally engage a portion of the pipeline and an associated friction force actuator, adapted to force the friction pad against the pipeline, wherein the frame comprises, for one or more of said annular arrays of clamping units, one or more mobile subframes, wherein each of said one or more mobile subframes carries one or more of the clamping units, and wherein each of said one or more mobile subframes is movably supported by a spring assembly to allow for elastic adjustment of the mobile subframe relative to said main frame structure only in said longitudinal direction of the frame.

2. The marine pipelaying friction clamp device according to claim 1, wherein the spring assembly is interpositioned between the mobile subframe and the main frame structure.

3. The marine pipelaying friction clamp device according to claim 2, wherein the spring assembly comprises adjustable characteristics.

4. The marine pipelaying friction clamp device according to claim 1, wherein the spring assembly is interpositioned between adjacent mobile subframes.

5. The marine pipelaying friction clamp device according to claim 4, wherein the spring assembly comprises adjustable characteristics.

6. The marine pipelaying friction clamp device according to claim 1, wherein the spring assembly comprises adjustable characteristics.

7. The marine pipelaying friction clamp device according to claim 6, wherein the one or more mobile subframes are each provided with a door portion comprising a clamping unit, which door portion is connected to the remainder of the mobile subframe via a hinge extending in the longitudinal direction of the frame allowing rotation of the door portion to allow the entry or removal of the pipeline.

8. The marine pipelaying friction clamp device according to claim 6, wherein the spring assembly comprises an adjustable and controllable bias.

9. The marine pipelaying friction clamp device according to claim 6, wherein the spring assembly comprises an adjustable and controllable spring constant.

10. The marine pipelaying friction clamp device according to claim 1, wherein the offshore subsea pipeline is coated.

11. The marine pipelaying friction clamp device according to claim 1, wherein each clamping unit comprises multiple friction pads simultaneously actuated by a single associated friction force actuator.

12. The marine pipelaying friction clamp device according to claim 1, further comprising an elastic member interposed between the friction pad and the friction force actuator.

13. The marine pipelaying friction clamp device according to claim 1, adapted to be used as a mobile clamp which is movable along a tower.

14. The marine pipelaying friction clamp device according to claim 1, adapted to be used as a static clamp.

15. The marine pipelaying friction clamp device according to claim 1, wherein the spring assembly comprises a cylinder coupled with an accumulator.

16. A method for launching an offshore subsea pipeline from a pipelaying vessel into the sea, wherein during launching use is made of a marine pipelaying friction clamp device for frictionally retaining the pipeline according to claim 1.

17. The marine pipelaying friction clamp device according to claim 1, further comprising slots in the frame, wherein the subframes are within the slots.

18. The marine pipelaying friction clamp device according to claim 1, further comprising brackets on each subframe; and
  a mounting bracket on the frame extending through the brackets on the subframes to guide the subframes in the longitudinal direction of the frame.

19. The marine pipelaying friction clamp device according to claim 1, further comprising actuators moving the clamping units radially.

* * * * *